US009651741B2

(12) United States Patent
Isenhour et al.

(10) Patent No.: US 9,651,741 B2
(45) Date of Patent: May 16, 2017

(54) SIMPLIFIED FIBER OPTIC CONNECTORS HAVING LENSES AND METHOD FOR MAKING THE SAME

(71) Applicant: CORNING OPTICAL COMMUNICATIONS LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/624,870

(22) Filed: Feb. 18, 2015

(65) Prior Publication Data
US 2015/0160418 A1   Jun. 11, 2015

Related U.S. Application Data

(62) Division of application No. 13/788,707, filed on Mar. 7, 2013, now Pat. No. 8,985,874.
(Continued)

(51) Int. Cl.
*G02B 6/36* (2006.01)
*G02B 6/38* (2006.01)
(Continued)

(52) U.S. Cl.
CPC ......... *G02B 6/3801* (2013.01); *G02B 6/3853* (2013.01); *G02B 6/3885* (2013.01);
(Continued)

(58) Field of Classification Search
CPC ... G02B 6/4292; G02B 6/4204; G02B 6/4246
(Continued)

(56) References Cited

U.S. PATENT DOCUMENTS

| 4,279,467 A | 7/1981 | Borsuk et al. |
| 4,840,451 A * | 6/1989 | Sampson ............. G02B 6/4292 385/88 |

(Continued)

FOREIGN PATENT DOCUMENTS

| CN | 100590469 A | 7/2008 |
| CN | 101828137 A | 9/2010 |

(Continued)

OTHER PUBLICATIONS

Chinese Search Report for Application No. 2013800211415, dated Jul. 8, 2015, 2 pages.

*Primary Examiner* — Jennifer Doan

(57) ABSTRACT

Disclosed are optical connectors having lenses along with methods for making the same. In one embodiment, the optical connector includes a fiber body having a front portion with a plurality of fiber guides, and a connector body having a plurality of connector body fiber guides that lead to a plurality of lenses at a front portion of the connector body. The fiber body attaches to the connector body and may align a plurality of optical fibers to the lenses at the front portion of the connector body. One embodiment has the fiber body configured as a crimp body with a barrel at a rear portion for attaching a fiber optic cable.

27 Claims, 7 Drawing Sheets

Related U.S. Application Data

(60) Provisional application No. 61/613,216, filed on Mar. 20, 2012.

(51) Int. Cl.
    *G02B 6/42*     (2006.01)
    *G02B 6/40*     (2006.01)
    *G02B 6/46*     (2006.01)
    *G02B 6/32*     (2006.01)
    *G02B 6/44*     (2006.01)

(52) U.S. Cl.
CPC ............... *G02B 6/40* (2013.01); *G02B 6/42* (2013.01); *G02B 6/46* (2013.01); *G02B 6/32* (2013.01); *G02B 6/3636* (2013.01); *G02B 6/3652* (2013.01); *G02B 6/3893* (2013.01); *G02B 6/4471* (2013.01); *Y10T 29/49016* (2015.01); *Y10T 29/49801* (2015.01)

(58) Field of Classification Search
USPC ............... 385/53, 81, 88, 89, 90, 91, 92, 93
See application file for complete search history.

(56) References Cited

U.S. PATENT DOCUMENTS

| | | |
|---|---|---|
| 6,130,977 A | 10/2000 | Rosson ........................... 385/76 |
| 6,226,429 B1 | 5/2001 | Hikita et al. |
| 6,421,493 B1 | 7/2002 | Burek et al. ................... 385/134 |
| 6,466,722 B1* | 10/2002 | Fujiwara ............... G02F 1/3558 385/122 |
| 6,547,449 B1 | 4/2003 | Dean, Jr. et al. ............... 385/78 |
| 6,565,262 B2 | 5/2003 | Childers et al. ................ 385/76 |
| 2008/0144999 A1 | 6/2008 | Takeda et al. .................. 385/51 |
| 2009/0154884 A1 | 6/2009 | Chen et al. ..................... 385/79 |
| 2010/0284651 A1 | 11/2010 | Krahenbuhl et al. ........... 385/35 |
| 2011/0081119 A1 | 4/2011 | Togami et al. ................. 385/89 |
| 2011/0299816 A1 | 12/2011 | Yen et al. ....................... 385/89 |
| 2012/0294570 A1* | 11/2012 | Hsu .......................... G02B 6/38 385/74 |

FOREIGN PATENT DOCUMENTS

| | | |
|---|---|---|
| EP | 1139127 A2 | 10/2001 |
| GB | 2239104 A | 6/1991 |
| JP | 11344642 A | 12/1999 |
| TW | 201145721 A1 | 12/2011 |

\* cited by examiner

SIMPLIFIED FIBER OPTIC CONNECTORS HAVING LENSES AND METHOD FOR MAKING THE SAME

PRIORITY APPLICATION

This application is a divisional of U.S. patent application Ser. No. 13/788,707 filed on Mar. 7, 2013, which claims the benefit of priority to U.S. Provisional Application No. 61/613,216 filed on March 20, 2012, the content of both applications being incorporated herein by reference.

FIELD

The disclosure relates generally to simplified fiber optic connectors having lenses and methods for making the same. Additionally, adapters for aligning the fiber optic connectors are disclosed.

BACKGROUND

Optical fibers have displaced copper-based connectivity in much of the traditional long-haul and metro telecommunication networks for numerous reasons such as large bandwidth capacity, dielectric characteristics and the like. As higher network speeds for communication networks are required the optical fiber will move deeper into the communication networks toward the electronics located in servers and switches that manage traffic on the communication network. As this migration of optical fibers deeper into communication networks occur new challenges will be encountered for making optical connections to the electronics. By way of example, aligning and maintain optical alignment of a plurality of optical fibers of an optical connection during operating conditions presents unresolved needs.

SUMMARY

The disclosure is directed to an optical connector including a fiber body having a front portion with a plurality of fiber body fiber guides, and a connector body having a plurality of connector body fiber guides that lead to a plurality of lenses at a front portion of the connector body. The fiber body attaches to the connector body, thereby providing a simple lens-based optical connector for optical connectivity. The optical connectors disclosed herein may optionally include a cover that fits into a window of the connector body if a window is used; otherwise, the window may be potted with a suitable material for providing environmental protection. In further embodiments, the fiber body may be configured as a crimp body having a barrel at the rear portion for securing the fiber optic cable thereto.

Other aspects of the disclosure are directed to a lens-based optical connector having a crimp body with a front portion having a plurality of fiber guides, a connector body having a plurality of connector body fiber guides that lead to a plurality of lenses at a front portion of the connector body along with an entrance at the rear portion of the connector body. The crimp body attaches to the connector body when received in the entrance of the connector body and seated into position. A plurality of optical fibers are received in the fiber guides of the crimp body and have their respective ends adjacent to the plurality of lenses of the connector body.

Also disclosed are lens-based optical connectors including a fiber body, a connector body having a plurality of lenses at a front portion of the connector body along with an entrance at the rear portion. The fiber body attaches to the connector body when received in the entrance of the connector body. A plurality of optical fibers maybe disposed in the fiber body and have their respective end disposed adjacent to the plurality of lenses so that the optical fibers are fixed relative to the optical connector during connector mating.

Methods of making an optical connector are also disclosed. The method includes providing a fiber body having a front portion with a plurality of fiber body fiber guides, placing a plurality of optical fibers within the fiber body fiber guides and securing the plurality of optical fibers to the fiber body so the optical fibers extend beyond the plurality of fiber body fiber guides, cleaving the plurality of optical fibers, inserting the fiber body into the connector body so that the plurality of optical fibers are adjacent to the plurality of lenses of the connector body. In other embodiments, the fiber body may be configured as a crimp body if desired.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
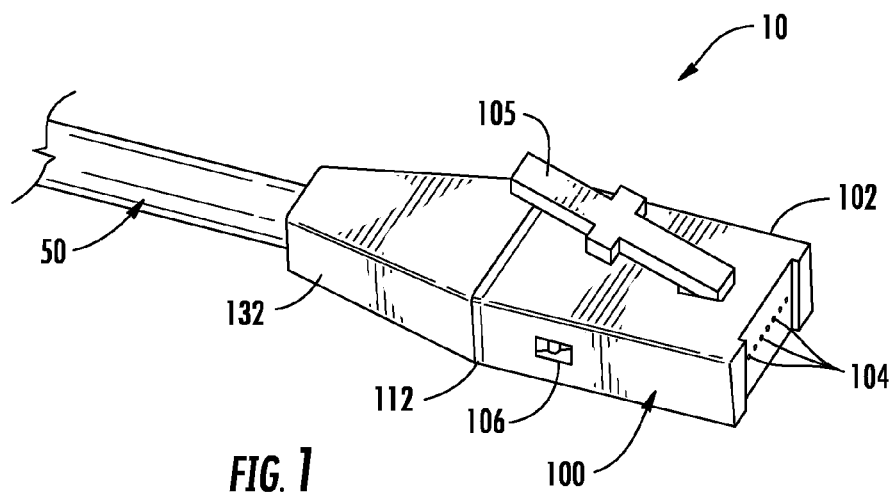
FIG. 1 is a top perspective view of a fiber optic cable assembly having an optical connector with a simplified construction according to the concepts disclosed herein.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Disclosed are fiber optic cable assemblies having an optical connector with a simplified construction that requires fewer parts than a conventional optical fiber connector. Since fewer parts are required the optical connector is quick and easy to manufacture. Moreover, the optical connector may use efficient and reliable manufacturing processes such as molded parts, UV curing, and laser processing for stripping and/or stripping cleaving optical fibers, thereby eliminating the need for mechanical polishing. The optical connector is a lens-based design having a plurality of lenses at the front portion of the connector body for expanding and focusing the optical signals from and to the optical fibers for transmitting optical signals. Moreover, the optical connector has a simple design where the crimp body attaches to the connector body and optical fibers and the lenses are fixed so they do not move during mating of the optical connector (e.g., not in a structure biased by a resilient member, but the optical fibers remain stationary in the connector). The optical connector and fiber optic cable assemblies described herein are advantageous since they provide a robust high-density optical solution that addresses the challenges for providing optical connectivity by providing an optical connector having optical fibers that are fixed relative to the connector body.

Figure 2:
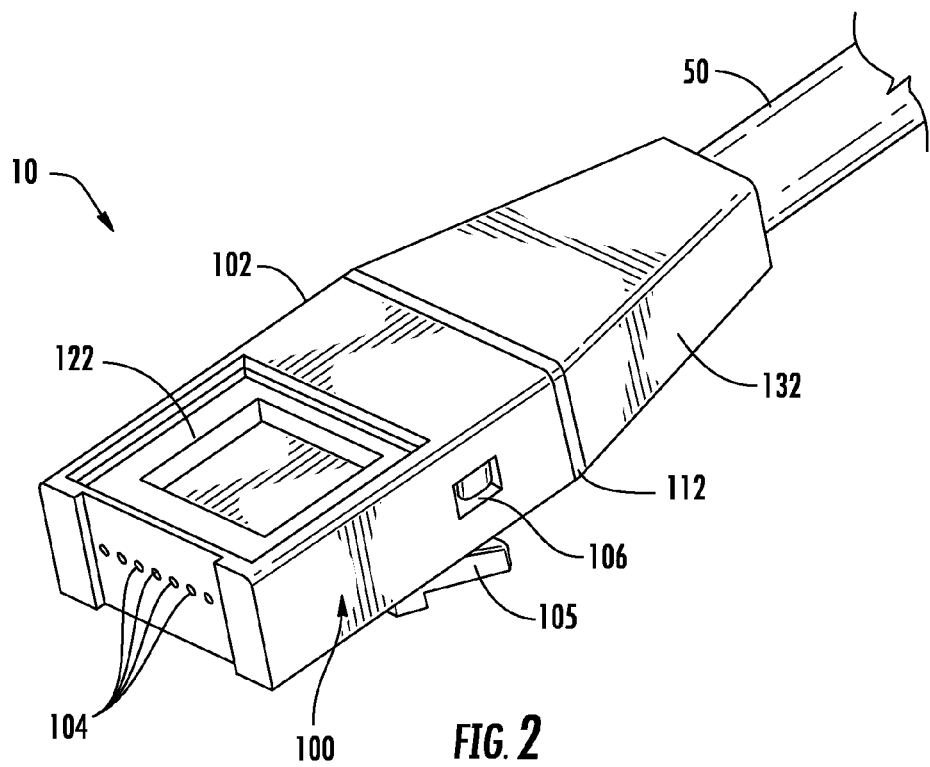
FIG. 2 is a bottom perspective view of the fiber optic cable assembly of FIG. 1 showing a cover attached to a connector body of the optical connector.

FIGS. 1 and 2 respectively are top and bottom perspective views of a fiber optic cable assembly 10 having an explanatory optical connector 100 with a simplified construction according to the concepts disclosed herein. Optical connector 100 is attached to a fiber optic cable 50, thereby forming fiber optic cable assembly 10. Optical connector 100 includes a connector body 102, a fiber body (not numbered) that is configured as crimp body 112 in this embodiment, and an optional cover 122 as discussed below. Connector body 102 provides an outer form factor for the optical connector 100 to simplify the design. A plurality of optical fibers may be disposed in the fiber body and in this embodiment the fiber body has the extra functionality by being configured as crimp body for attaching/strain relieving the fiber optic cable to the optical connector. Of course, the optical connector concepts disclosed herein may be used with optical fiber ribbons, loose optical fibers, or the like; instead of being attached to a cable. For instance, a plurality of optical fibers may enter the fiber body shown in FIGS. 1 and 2. Further, the optical connector according to the concepts may be used at other desired locations such as optical backplanes, server blades, etc.

As shown, connector body 102 has a plurality of lenses 104 integrally formed with the connector body 102 arranged in an array at the front end of the optical connector. In this embodiment, the connector body 102 has a single-row array of lenses 104 such as 2, 4, 8, 12, etc., but other arrays are possible such as multi-row arrays according to the concepts disclosed to increase the number of optical channels. Lenses 104 could have arrangements other than being integrally formed with the connector body 102 as shown. For instance, the lenses 104 could be individual gradient index (GRIN) lenses that are inserted into respective bores on the front end of connector body 102 or lenses 104 could be formed as an array on a separate plate that attaches to the front end of connector body 102, but these variations would require more parts and require further complexity during assembly compared with having the lenses integrally formed with the connector body 102 as shown.

Figure 9:
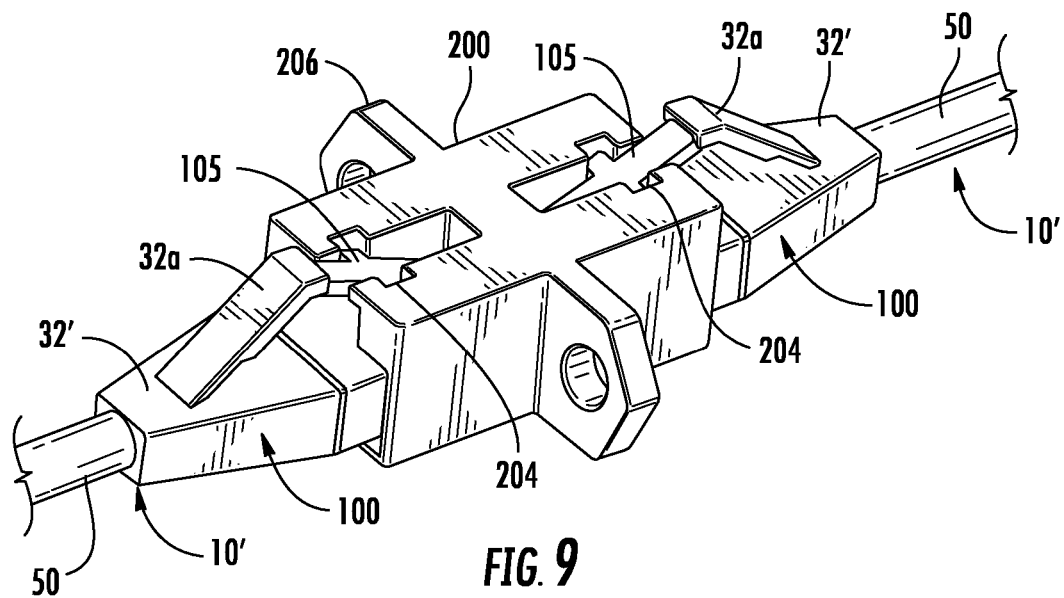
FIGS. 9 and 10 are views showing the optical connectors of the fiber optic cable assembly of FIGS. 1 and 2 inserted into an explanatory fiber optic adapter having a mounting flange.
Figure 10:
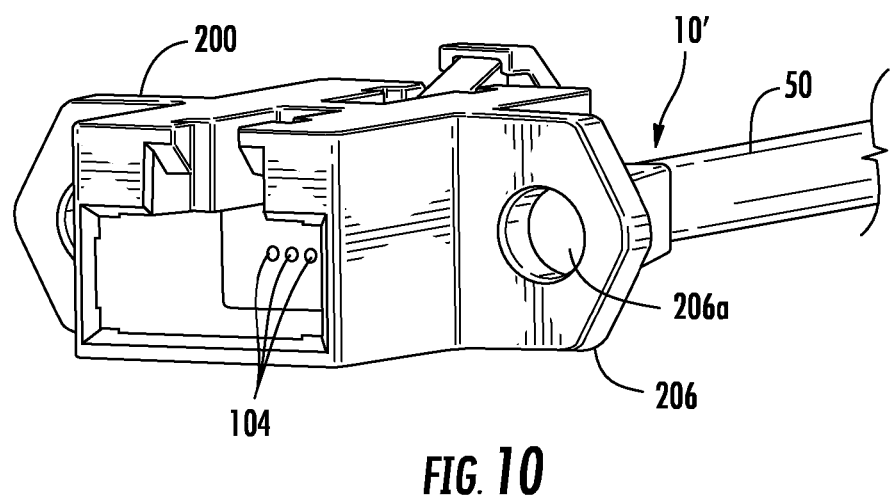

Further, optical connector 100 has a simplified construction since the fiber body attaches directly to connector body 102 and provides an outer form factor for the optical connector 100. In other words, the outer surface of the connector body 102 is received in communication with the adapter, receptacle or the like such as shown in FIGS. 9 and 10. Thus, the optical connectors disclosed herein may be formed by the fiber body and the connector body without the need for more parts such as inner or outer housings, springs, ferrules, etc; however, embodiments of optical connectors disclosed herein can include other parts as desired such as a cover, boot, or crimp band, etc. In this embodiment, the fiber body is configured as crimp body 112 and will be referred to as such with respect to the discussion; however, the fiber body can have other configurations with fiber guides at the front portion and an open channel or the like at the rear portion as desired.

Because the optical connectors disclosed herein have fewer components they are also easy to assembly, even with larger numbers of optical channels such as four or more. The fiber body attaches to the connector body in any suitable manner. For instance, assembly of the crimp body 112 to the connector body 102 is accomplished by using attachment features on the crimp body that cooperate with attachment features on the connector body, but may be attached in other manners such as using and adhesive instead of, or in addition to, attachment features. Moreover, crimp body 112 can act as a datum for processing the plurality of optical fibers that are secured thereto such as stripping and cleaving the optical fibers to length using a mechanical and/or laser process.

Figure 3:
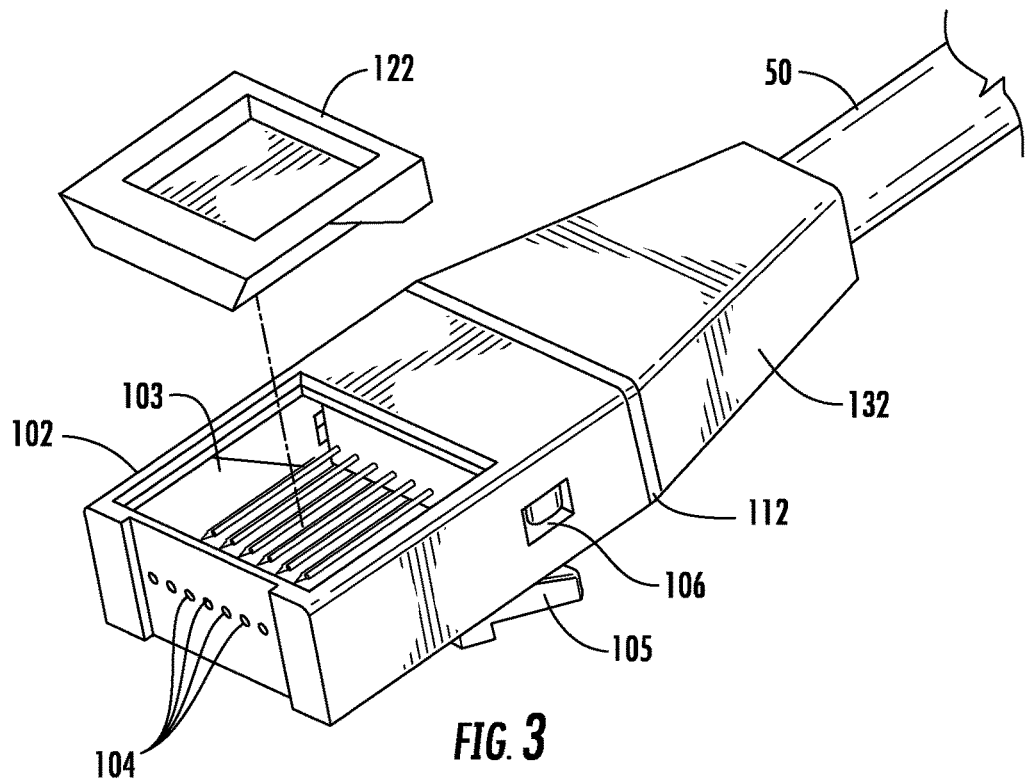
FIG. 3 is a bottom partially exploded perspective view of the fiber optic cable assembly shown in FIGS. 1 and 2 with the cover removed for showing the optical fibers disposed in respective fiber guides of the connector body.

As best shown in FIG. 2, cover 122 attaches to a portion of connector body 102. Specifically, cover 122 is sized and shaped to fit to a window 123 of connector body 102 for securing the optical fibers of cable 50 so the respective ends of the optical fibers are adjacent respective lenses 104 of connector body 102 for transmitting/receiving optical signals. The cover 122 may be formed from any suitable material and need not be formed from an optically transmissive material. The cover 122 may be used with or without an adhesive such as a UV curable, or like material. Cover 122 may have a friction or snap-fit in window 123, or be secured using fasteners, but fasteners introduce more parts and increases complexity. In this embodiment, connector body 102 has a plurality of connector body fiber guides 108 (FIG. 5) that lead to the plurality of lenses 104. FIG. 3 is a bottom perspective view showing optical connector 100 with cover 122 removed from the window 123 of connector body 102. FIG. 3 also shows a plurality of optical fibers 12 of fiber optic cable 50 disposed in respective fiber guides 108 of the connector body 102. In this embodiment, connector body 102 has a plurality of connector body fiber guides that lead to the plurality of lenses 104. Window 103 of connector body 102 is disposed on a side opposite is a latch of connector body 102. However, the cover 122 is optional since the window 123 of the connector body 102 could be potted with a suitable material instead of using a discrete cover for securing the optical fibers in a proper position. For instance, the cover 122 may retain the optical fibers in a downward and/or forward position for maintaining optical continuity at the interface. Additionally, an index-matching gel or the like may be used at the ends of the optical fibers for improving optical continuity as desired.

Figure 4:
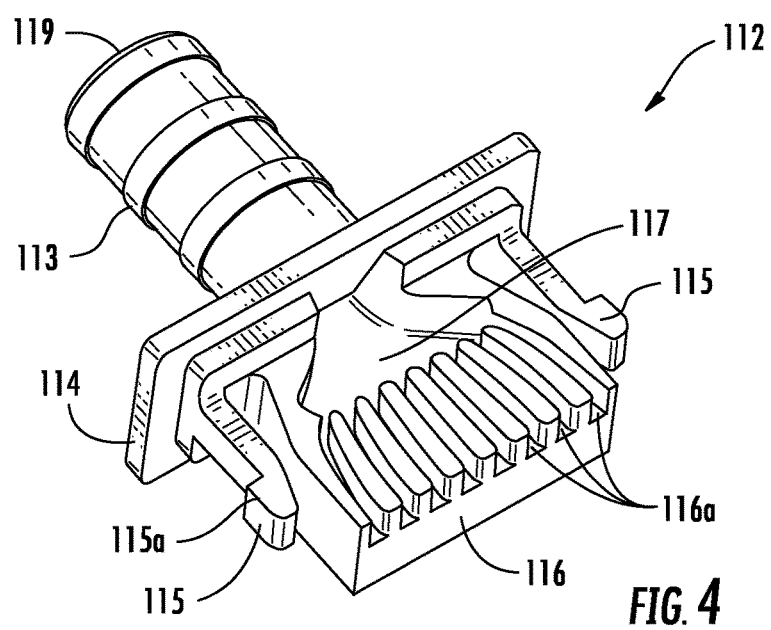
FIGS. 4-6 are various perspective views showing the components of the explanatory optical connector shown in FIGS. 1 and 2.
Figure 5:
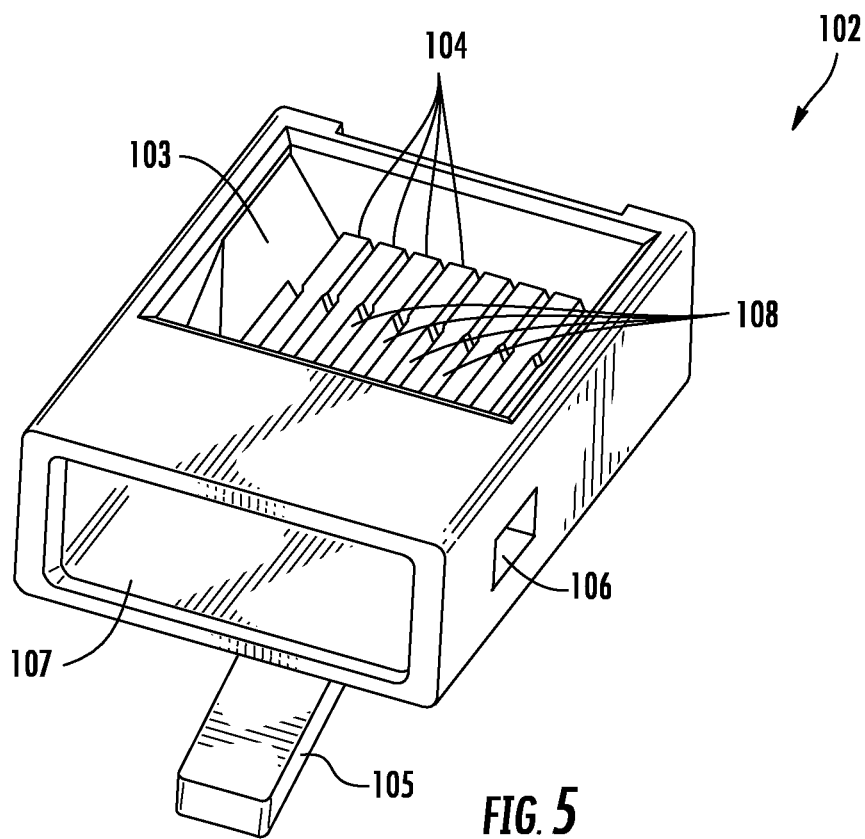
Figure 6:
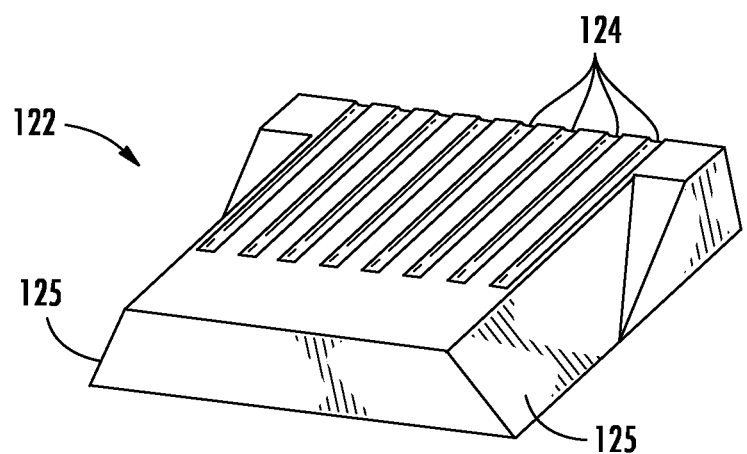

FIGS. 4-6 are various perspective detailed views showing the components of optical connector 100. FIG. 4 depicts crimp body 112 from a front perspective view to show details. Crimp body 112 includes a barrel 113 at the rear end and a fiber guide 116 at the front end separated by a flange 114 at a medial portion. Barrel 113 has a tubular shape with a passageway 119 that extends from the rear portion to the medial portion of the crimp body 112 that leads to a fan-out feature 117; however, other structures are possible at the rear portion such as a channel for the fiber body (e.g., such as a partially open barrel or U-shaped structure). Barrel 113 may be used for securing strength members (not visible) of fiber optic cable 50 thereto for cable strain relief For instance, the strength members of the cable are secured between barrel 113 and a crimp band (not shown) so that forces applied to the strength members may be transferred to the crimp body 112. Optical fibers of the cable are routed through passageway 119 and toward the front portion of crimp body 112 for proper positioning within the fiber guide 116. Thus, crimp body 112 may serve several functions in a single component such as by providing strain relief using the barrel 113, act as a fiber organizer and fan-out, and/or also using as a fixture for optical fiber processing such as using the flange of the medial portion as a datum for stripping and/or cleaving optical fibers At the front portion, crimp body 112 includes a fiber guide 116 and fan-out feature 117 (i.e., a zone) for flaring out the optical fibers to a predetermined spacing for alignment of the optical fibers in individual fiber guides 116a of fiber guide 116. Fiber guides 116a include a spacing generally matching the spacing of lenses 104 of the connector body 102 to form an expanded beam connector using the lenses. By way of example, the lenses could be an array of lenses having a 500 micron diameter with a 750 micron pitch between lens centers for inhibiting optical cross-talk from large core diameter optical fibers such as optical fibers having core of about 50 microns or greater arranged adjacent to the lenses. However, other suitable dimensions are possible for the lens diameter, lens pitch and/or optical fiber cores as desired. The spacing and placement of the optical fibers 54 in the individual fiber guides 116a also provides room for processing the optical fibers. This particular embodiment is configured as a single row of lenses, but multiple rows of lenses are possible. For example, a similar structure of fiber guides could be formed on the opposite sides of the both the crimp body and the connector body so that the optical connector included optical channels in two or more rows. Likewise, connector body 102 has a plurality of connector body fiber guides 108 (FIG. 5) with a similar spacing as the fiber guides of the crimp body 112 for receiving and leading the respective ends of the plurality of optical fibers 54 (FIG. 7) to the plurality of lenses 104 at the front portion of connector body 102.

FIG. 5 shows details of connector body 102. Connector body 102 has a cavity (not numbered) generally defined by the window 103 and rear entrance 107. The cavity allows inspection of the optical fiber locations when attaching the crimp body 112 with connector body 102 to verify correct optical fiber position with respect to lenses 104 along with access to the optical fibers if an adjustment to the optical fiber location is required. Entrance 107 at the rear portion is provided for receiving a portion of the crimp body 102 in the connector body 102. Connector body 102 may also include attachment features such as one or more openings 106 for cooperating with attachment features of the crimp body 112 such as one or more resilient arms such as first and second cantilevered arms 115,115 used for securing the components together. Detents 115a disposed on respective portions of cantilevered arms 115 cooperate with respective openings 106 for securing the crimp body 102 to connector body 112 in the proper position. Connector body 102 may also include a latch that may be an integrated latch 105 formed as part of the connector body 102 as shown to keep a lower part count.

Within the cavity, connector body 102 has a plurality of connector body fiber guides 108 that lead to the plurality of lenses 104 at a front portion of the connector body. As shown, fiber guides 108 are integrally formed with the connector body and may have different sizes (e.g., stepped profile) along their lengths for receiving and aligning different portions of the optical fibers 54. By way of example, a rear portion of fiber guide 108 may be larger for receiving a portion of the optical fiber 54a (FIG. 7) that has a coating and a front portion of the fiber guide may be smaller for receiving a portion of the optical fiber 54b (FIG. 7) that had one or more coatings stripped leaving the core and cladding of the optical fiber. Additionally, the rear side of lenses 104 may further include a recess or divot (not visible) for receiving and locating the end of the respective optical fiber relative to the middle of the lens. This recess or divot can be formed during a molding process along with the other features of the connector body. Thus, the inner surface at the front portion of the internal cavity of connector body 112 acts as respective optical datum for each of the optical fibers. Stated another way, the respective ends of a plurality of optical fibers of the cable extending beyond the plurality of fiber guides of the fiber body may be processed to a desired length to cooperate with the rear side of lenses 104. If lenses 104 are integrally formed with connector body 112, then the connector body 112 is made from a suitable optically transmissive material for transmitting the desired optical wavelengths for transmission of optical signals in the material such as a suitable blend of ULTEM. Connector body 102 may also include attachment features such as one or more openings 106 for cooperating with alignment features of the crimp body such as one or more resilient arms. Although the attachment features are shown as cantilevered arms 115 and openings 106, other suitable attachment features/structures are possible.

FIG. 6 is a perspective view of cover 122 that may be received in window 103 of connector body 102 for securing optical fibers in position. Cover 122 includes a top and a bottom. The bottom may include one or more grooves 124 for securing optical fibers in the desired position when the cover 122 is installed. As a further optional feature, the cover 122 may include one or more ramp surfaces 125. The ramp surfaces 125 allow a precise fit into the window 103 and may provide a forward biasing of the cover 122 as it inserted into the window 103 and/or the surfaces may be used simply for centering and aligning the cover 122. Stated another way, the forward biasing pushes the optical fibers forward toward the lenses during insertion of the cover 122. Other embodiments can simply use a material such as a UV curable material for potting the optical fibers in position within the connector body and eliminated the need for the cover since the cavity is sealed from the environment.

Figure 7:
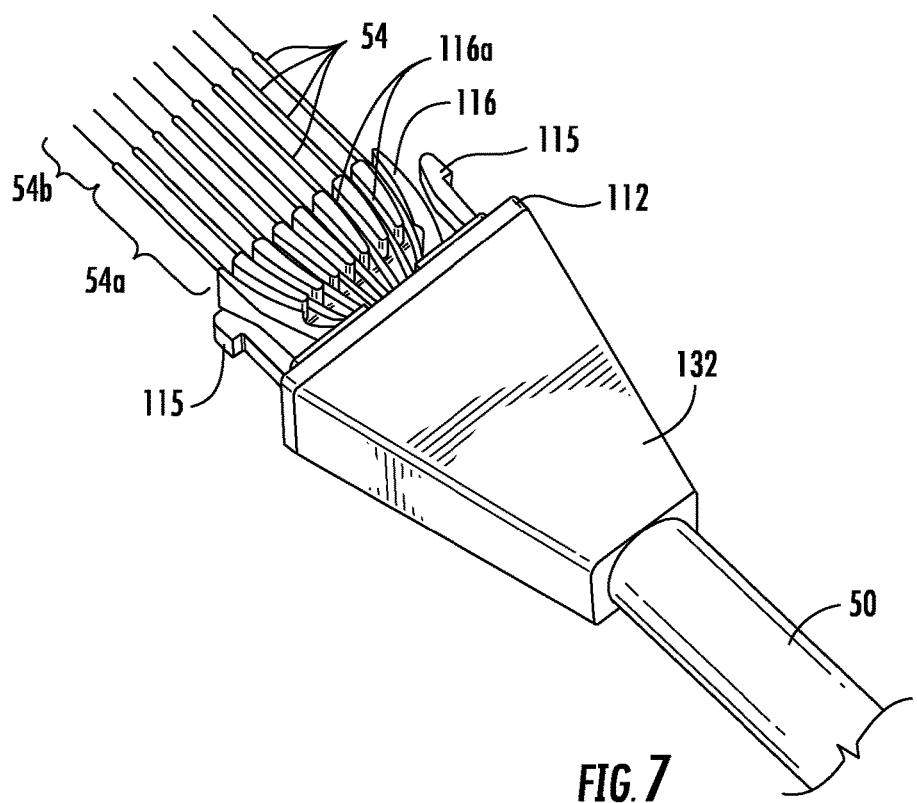
FIGS. 7 and 8 are views showing various stages of assembly for making the optical connector and the fiber optic cable assembly of FIGS. 1 and 2.
Figure 8:
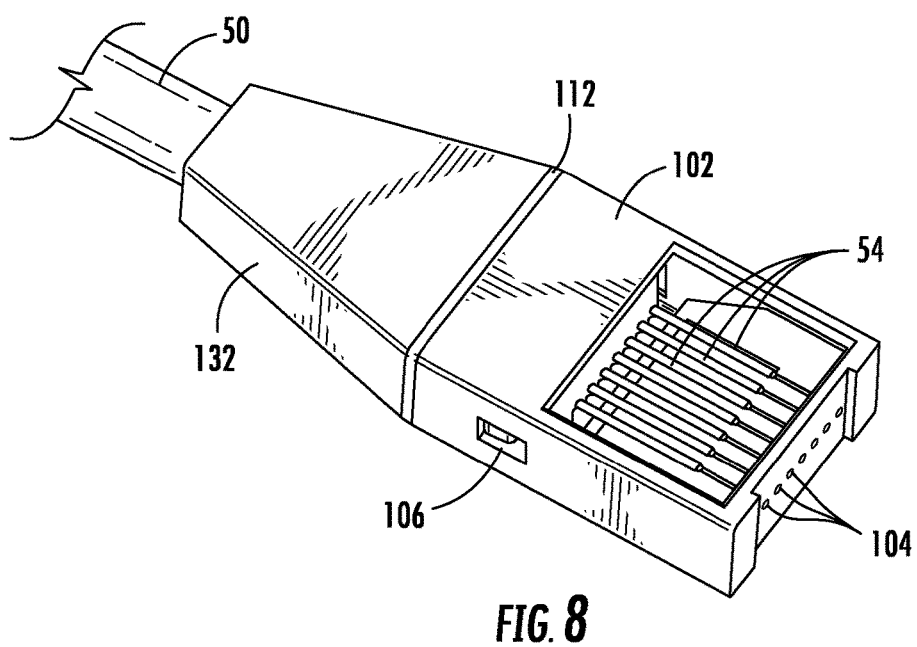

FIGS. 7 and 8 are views showing various stages of assembly for making optical connector 100 and fiber optic cable assembly 10. FIG. 7 is a top perspective view having optical fibers 54 of fiber optic cable 50 inserted into the crimp body 112. Optical fibers 54 are routed from the end of the cable through passageway 119 and toward the front portion of crimp body 112 for proper positioning within the fiber guide 116. Specifically, individual optical fibers 54 are placed routed within individual fiber guides 116a so that the respective end of the plurality of fibers extend beyond the plurality of fiber guides of the fiber body or crimp body. Optionally, the strength members (not shown) of the fiber optic cable 50 are strain-relieved between the barrel 113 of crimp body 112 and a crimp band (not visible) or the like, and then a boot 132 may be slid-up along the cable 50 to attach the boot to the rear portion of crimp body 112 as shown. The optical fibers 54 may be secured to the crimp body or a demarcation created for the optical fibers created for inhibit movement of the optical fibers. For instance, an adhesive, silicone or other material may be injected into the passageway 119 for creating a demarcation and inhibiting fibers therein from moving into or out of the crimp body 112; alternatively, the demarcation can be created in the cable or another portion of the crimp body such as the fiber guides. Once the sub-assembly is constructed so that optical fibers 54 are disposed within crimp body 112 the optical fibers can have their respective ends processed. As shown, optical fibers 54 are processed/prepared by stripping a portion of the coating from the ends of the optical fibers 54 to form fiber portion 54b and then cleaving the individual optical fibers to the desired length so the respective end faces of the optical fibers are adjacent to lenses 104 when the optical connector is assembled. By way of example, a portion of the optical fiber 54 extending from crimp body 112 includes a portion 54a with one or more coatings still on the optical fiber and a portion 54b where the coating is stripped from the optical fiber 54. The stripping and/or cleaving of the optical fibers may be performed using a laser and/or mechanical process as desired. The sub-assembly shown in FIG. 7 may be used as a fixture for processing the plurality of optical fibers 54. In other words, the flange 114 or other portion of the sub-assembly may be used for referencing (i.e., a datum) for providing the end of the optical fibers with a suitable length and geometry for completing the optical connector 100.

FIG. 8 is a bottom perspective view showing the crimp body 112 fully inserted into entrance 107 and attached to connector body 102. As shown, the end portions of optical fibers 54 extend into the respective fiber guides 108 of connector body 102 and are disposed adjacent to the plurality of lenses 104 at the front portion of connector body 102. As the crimp body 102 is inserted into entrance 107 the optical fibers 54 are generally positioned and spaced to align with the fiber guides 108 during insertion. The first and second cantilevered arms 115 are deflected inward as they enter connector body 102 and then spring outward when detents 115a on the cantilevered arms 115 engage openings 106, thereby securing the crimp body assembly to the connector body 102. Other attachment structure and/or adhesives may also be used for securing the crimp body 112 with connector body 102. Thereafter, cover 122 may be inserted into window 103 such as shown in FIG. 3 or the window 103 may be potted with a suitable material if desired for protecting the ends of the optical fibers.

Figure 11:
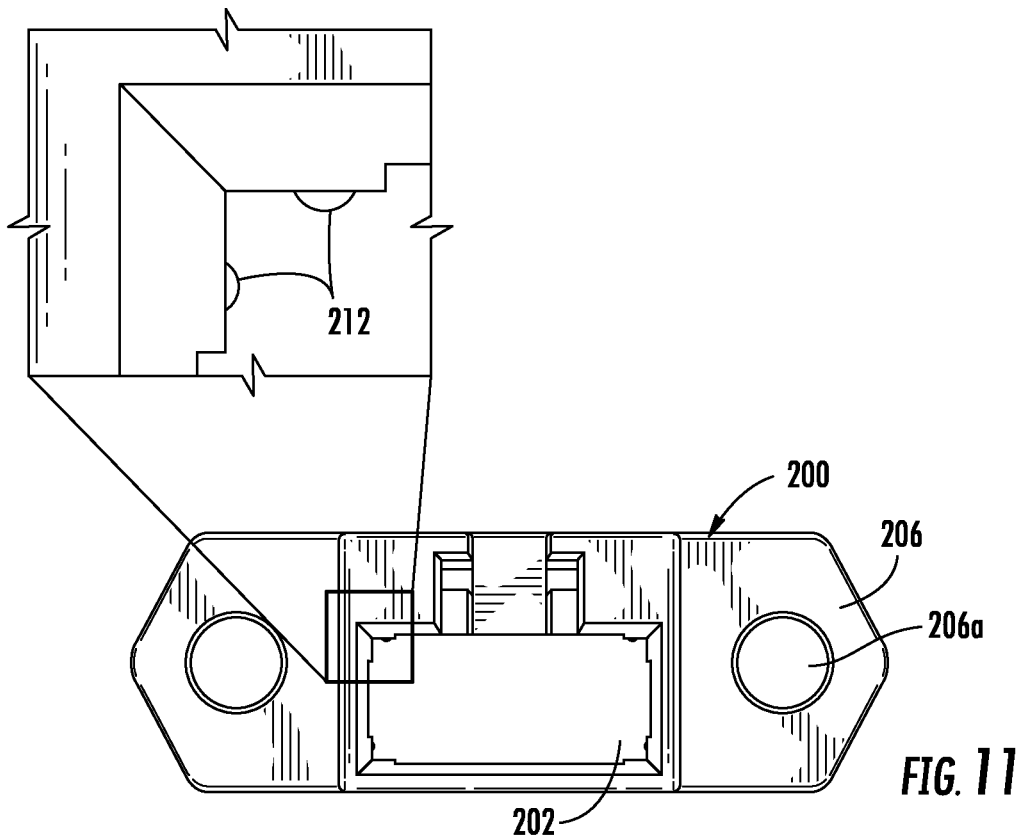
FIGS. 11 and 12 respectively are front and perspective views of the fiber optic adapter of FIGS. 9 and 10.
Figure 12:
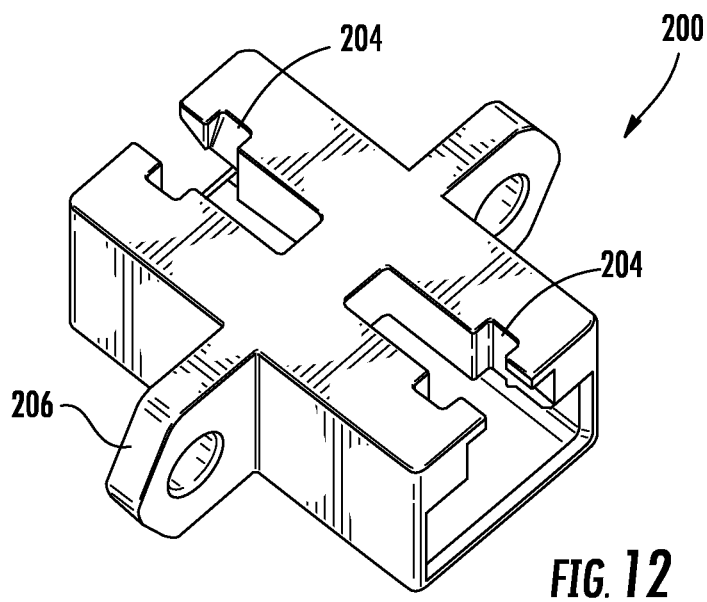

The optical connectors 10 may be connected to any suitable device for making an optical connection such as consumer electronic device such as tablet, PDA, laptop, smart-phone, etc., a network switch, a blade at a backplane, or to another similar optical connector using an adapter. FIG. 9 is a perspective view showing optical connectors 100' similar to optical connector 100 as a portion of respective fiber optic cable assemblies 10' inserted into an explanatory fiber optic adapter 200 for optical connection. FIG. 10 shows another view of adapter 200 with the near fiber optic cable assembly being removed from the adapter 200 so that the lenses 104 of the rear optical connector 100' are visible in a passageway 202 of the adapter 200. In this embodiment, adapter 200 has a mounting flange 206 with one or more apertures 206a for securing the adapter 200. Adapter 200 also includes a cutout 204 on each side of flange 206 for securing the optical connector 100' to the adapter 200. As depicted, optical connectors 100' include a latch 105 formed as part of the connector body, the latch 105 engages the cutout 204 on the adapter 200 for securing the optical connector thereto. When it is desired to remove the optical connector 100' the technician can push down on the latch 105 and pull the optical connector 100' rearward from adapter 200. Optical connector 100' is different from optical connector 100 since it further includes a boot 132' having a latch guard 132a'. Latch guard 132a' inhibits cables from getting tangled in the latch 105 and also functions as a trigger for easily engaging (i.e., depressing) the latch 105 to release it from the adapter 200. FIGS. 11 and 12 respectively are front and perspective views of the fiber optic adapter 200 without optical connectors. As best shown in FIG. 11, the passageway 202 of adapter 200 may include one or more ribs 212 for biasing/centering the optical connector inserted into the adapter 200. By way of example, ribs 212 may be located at the corners of the passageway 202 for centering and aligning the optical connector for improving optical connectivity. The ribs 212 may be shaped so they have a degree of deformation when the optical connector is inserted if desired.

Figure 13:
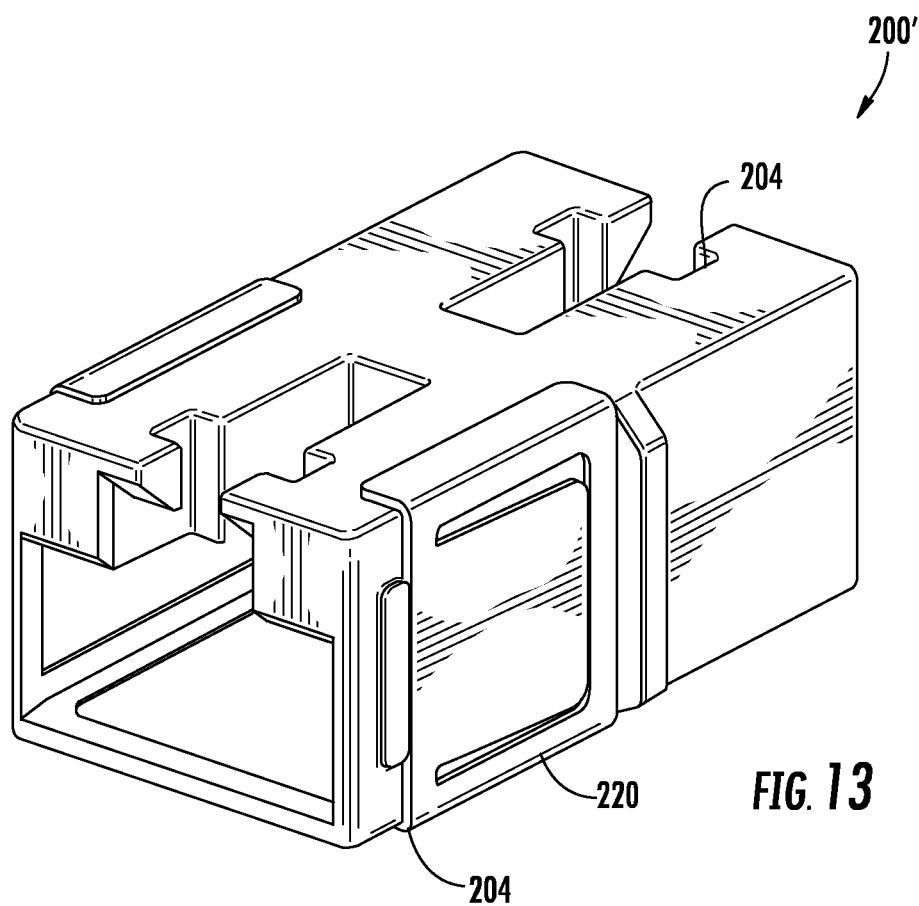
FIG. 13 is a perspective view of another fiber optic adapter for optical connectors disclosed herein.

Other adapters or structures may include the optical connectors disclosed herein. By way of example, FIG. 13 is a perspective view of another fiber optic adapter 200' for optical connectors disclosed herein. Adapter 200' is similar to adapter 200, but does not include a flange for mounting the same.

Method of making the optical connector and related assemblies are also disclosed herein. In one embodiment, a method of making an optical connector includes providing a fiber body having a front portion with a plurality of fiber body fiber guides, placing a plurality of optical fibers within the fiber body fiber guides and securing the plurality of optical fibers to the fiber body so the plurality of optical fibers extend beyond the plurality of fiber body fiber guides, cleaving the plurality of optical fibers, inserting the fiber body into a connector body so that the plurality of optical fibers are adjacent to a plurality of lenses of the connector body. The method may include other steps such as placing of the optical fibers in the fiber body for fanning-out the plurality of optical fibers with a predetermined spacing. The optical fibers may be optionally secured using a suitable material such as a UV curable material or the like. The method may include processing the optical fibers using a mechanical and/or laser process for stripping one or more coatings and/or cleaving the optical fibers to length. In other embodiments, the fiber body may be configured as a crimp body including a barrel at the rear portion and a front portion with fiber guides and may include a flange at a medial portion. A cover may be attached to the connector body if desired. Further, a demarcation may be used for securing the optical fibers to inhibit movement of the optical fibers inside the optical connector.

A detail description of a method of making a cable assembly having an optical connector is further disclosed. The method of making a cable assembly includes providing a cable and threading the boot and/or crimp band onto the cable. The end of the cable may be prepared by exposing optical fibers and strength members such as aramid, Kevlar or the like and then placing a plurality of optical fibers within/through the crimp body and into the fiber guides of the crimp body. Thereafter, securing the plurality of optical fibers to the crimp body in the desired arrangement such as by using an adhesive or the like. Optionally, the assembly may include an optical fiber demarcation for inhibiting the movement of optical fibers and associated strain near or in the optical connector. By way of example, an adhesive or the like may be applied within the barrel of the crimp body and/or cable for securing the optical fibers and inhibit forces/pistoning of the optical fibers near or at the optical connector.

Further, if the cable includes strength members, the distributing the strength members about the crimp body and securing the strength members to the crimp body using the crimp band (i.e., crimping the band about the strength members onto the crimp body) is performed. Sliding the boot forward onto the optical connector occurs if the boot is used. Laser processing the optical fibers such as stripping and cleaving to the desired length is possible, but mechanical processing of the optical fibers is also possible. After the ends of the optical fibers are processed, the crimp body may be inserted into the connector body so that the plurality of optical fibers are adjacent to a plurality of lenses of the connector body. The method may also include attaching a cover to the connector body and/or using a UV curable or other suitable for securing the plurality of optical fibers in position within the optical connector.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of making an optical connector, comprising:
   providing a fiber body having a front portion with a plurality of fiber body fiber guides;
   placing a plurality of optical fibers within the fiber body fiber guides and securing the plurality of optical fibers to the fiber body so the plurality of optical fibers extend beyond the plurality of fiber body fiber guides;
   cleaving the plurality of optical fibers;
   inserting a portion of the fiber body into an entrance of a connector body so that the plurality of optical fibers are adjacent to a plurality of lenses of the connector body.

2. The method of claim 1, the placing of the optical fibers within the fiber body including fanning-out the plurality of optical fibers with a predetermined spacing.

3. The method of claim 1, the cleaving of the plurality of optical fibers including using a laser process.

4. The method of claim 1, further comprising attaching a cover to a window of the connector body.

5. The method of claim 1, further comprising using a UV curable material for securing the plurality of optical fibers.

6. The method of claim 1, the fiber body being configured as a crimp body having a flange at a medial portion of the fiber body and a barrel at a rear portion of the fiber body.

7. A lens-based optical connector, comprising:
   a fiber body;
   a connector body having a plurality of lenses at a front portion of the connector body, an entrance at a rear portion of the connector body, and a plurality of fiber guides, wherein the fiber body attaches to the connector body and the entrance receives a portion of the fiber body; and
   a plurality of optical fibers disposed in the fiber body and having a plurality of respective ends disposed adjacent to the plurality of lenses, wherein portions of the plurality of optical fibers extend into the plurality of fiber guides respectively.

8. The lens-based optical connector of claim 7, the fiber body having a front portion with a plurality of fiber guides.

9. The lens-based optical connector of claim 7, the fiber body having at least one attachment feature for attaching the fiber body to the connector body.

10. The lens-based optical connector of claim 8, the plurality of fiber guides having a fan-out feature with a predetermined spacing.

11. The lens-based optical connector of claim 7, the fiber body having a medial portion with a flange.

12. The lens-based optical connector of claim 7, further including a cover.

13. The lens-based optical connector of claim 12, the cover being transmissive to ultra-violet wavelengths.

14. The lens-based optical connector of claim 12, the cover further including a plurality of grooves for seating a plurality of fibers within the connector body.

15. The lens-based optical connector of claim 7, the connector body having an integrated latch.

16. The lens-based optical connector of claim 7, the connector body having one or more standoffs at a front portion for protecting the plurality of lenses.

17. The lens-based optical connector of claim 7, further including a boot that attaches to the fiber body.

18. The lens-based optical connector of claim 17, the boot further including a latch guard.

19. The lens-based optical connector of claim 7, the fiber body having a first cantilevered arm and a second cantilevered arm.

20. A lens-based optical connector, comprising:
    a fiber body having a first plurality of fiber guides; and
    a connector body comprising:
       a plurality of lenses at a front portion of the connector body;
       a second plurality of fiber guides corresponding to the plurality of lenses; and
       an entrance configured to receive the first plurality of fiber guides of the fiber body,
    wherein the fiber body attaches to the connector body, and the first plurality of fiber guides are in line with the second plurality of fiber guides respectively.

21. The lens-based optical connector of claim 20, further comprising
    a plurality of optical fibers disposed both on the first plurality of fiber guides and the second plurality of fiber guides.

22. The lens-based optical connector of claim 20, wherein each of the second plurality of fiber guides has different size along a length of the each of the second plurality of fiber guides.

23. The lens-based optical connector of claim 21, wherein the plurality of optical fibers have varying radius along lengths of the plurality of optical fibers.

24. The lens-based optical connector of claim 7, wherein the connector body further comprises a window disposed on a bottom of the connector body, the plurality of fiber guides being exposed through the window.

25. The lens-based optical connector of claim 24, further comprising a cover configured to cover the window of the connector body.

26. The lens-based optical connector of claim 20, wherein the connector body further comprises a window disposed on a bottom of the connector body, the second plurality of fiber guides being exposed through the window.

27. The lens-based optical connector of claim 26, further comprising a cover configured to cover the window of the connector body.

* * * * *